Nov. 29, 1932.  W. C. WARREN  1,889,578
SLED
Filed Aug. 21, 1931
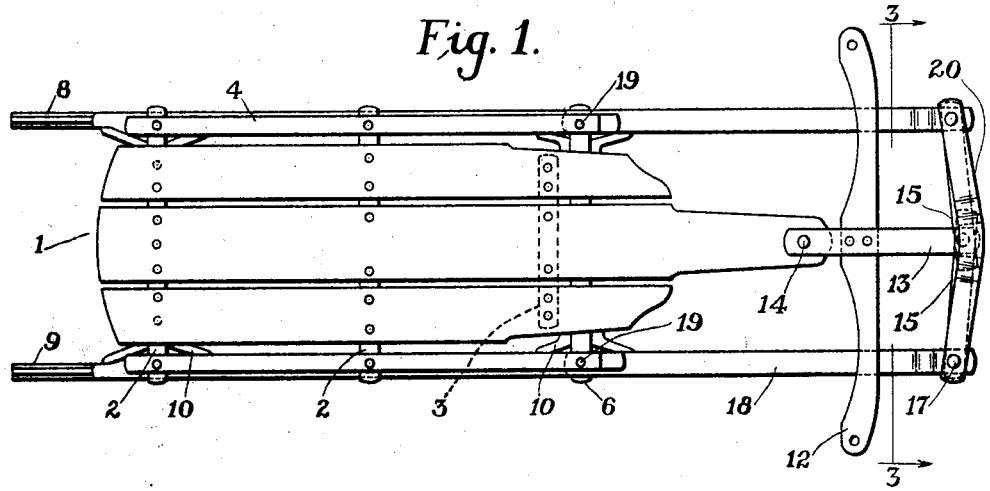
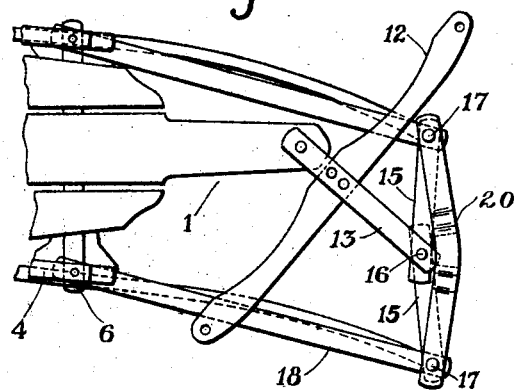
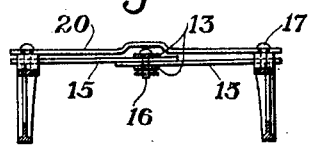
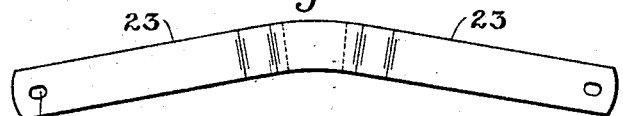
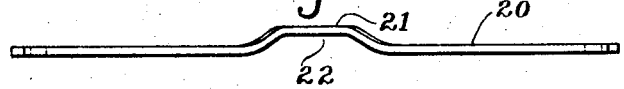
INVENTOR.
WILLIAM C. WARREN
BY
ATTORNEYS.

Patented Nov. 29, 1932

1,889,578

UNITED STATES PATENT OFFICE

WILLIAM C. WARREN, OF PHILADELPHIA, PENNSYLVANIA, ASSIGNOR TO S. L. ALLEN & CO., INC., OF PHILADELPHIA, PENNSYLVANIA, A CORPORATION OF PENNSYLVANIA

SLED

Application filed August 21, 1931. Serial No. 558,427.

My invention relates to sleds and more particularly to an improved guard or buffer especially applicable to sleds of the type which are steered by bending the runners laterally through the medium of a steering bar extending transversely of the sled. A sled of this character is disclosed in U. S. Letters Patent 1,820,044 issued to James M. Bowen, on August 25, 1931, and, considered generally, comprises, among other things, a wooden deck formed of longitudinally extending slats, the rear portion of which is secured to benches rigidly supported from the runners and side rails of the sled, a steering tongue pivotally connected to the front end of the central slat, extending forwardly therefrom and pivotally connected to a pair of generally transversely extending links in turn respectively pivoted to the ends of the runners, and a steering bar supported by the steering tongue, so that by movement of the bar the runners may be bent laterally in unison to steer the sled on an arcuate course.

Sleds of this type are considered superior to those in which the forward ends of the runners are connected by a cross bar of rigid construction and to which the steering tongue is pivoted, in that they afford greater ease in steering and can be directed in a curve of smaller radius, but since the shock of a head-on collision with a tree or other obstacle is necessarily received on the movable steering links, the force of the impact is very largely transmitted through the steering tongue directly to the wooden deck of the sled, thus tending to loosen the deck from its fastenings and sometimes to split the slats thereof or otherwise injure them.

The principal object of the present invention, therefore, is to provide means adapted to receive the force of the impact when the sled of which it forms a component part encounters an obstruction and operative to transmit the shock of the collision to the runners and framework of the sled and thus substantially relieve the deck therefrom.

A further object of the invention is to provide a guard or buffer of the character referred to and thus operative to prevent damage to or loosening of the sled deck from a head-on collision, yet which in nowise impairs the flexibility or ease of steering of the sled or the extent to which the forward ends of the runners may be deflected by suitable movement of the steering bar.

Still further objects of the invention are to provide means adapted for the satisfactory performance of the aforesaid functions which does not, however, materially increase the cost of production of the sled nor detract from the appearance thereof, which tends to enhance the general strength and rigidity of the sled and which does not in any way interfere with its use in the ordinary way while enhancing the safety of the occupant as well as minimizing the danger of injury to the sled itself if it be forcibly pulled against an obstruction or encounters the same in a head-on collision while being used for coasting.

Other purposes, objects and advantages of the invention are hereinafter more particularly pointed out or will be readily apparent from the following description of a preferred embodiment thereof during which reference will be had to the accompanying drawing in which Fig. 1 is the top plan view of a sled embodying the invention with the runners of the sled in normal position; Fig. 2 is a fragmentary top plan view of the forward part of the sled as it appears when the runners are deflected or bent when the sled is being steered to the right; Fig. 3 is a fragmentary transverse section on the line 3—3 in Fig. 1 looking in the direction of the arrows. Fig. 4 is a detail top plan view of the buffer removed from the sled and on a somewhat larger scale than as shown on the other figures and Fig. 5 is a rear elevation thereof. In the several figures like characters are used to designate the same parts.

Referring now more particularly to the drawing, the sled therein shown is generally similar to that disclosed in the patent to which reference has been made, the present invention, as hitherto stated, being particularly applicable to sleds of that general type. The sled thus comprises a deck 1 which may be formed of three longitudinally extending wooden slats with the center slat considerably longer than the side slats and extending forwardly beyond the ends of the latter, the slats being held together by transversely extending benches 2 and a cleat 3 to which the slats are nailed or otherwise suitably secured. The benches, respectively disposed near the rear end of the deck and at about the middle thereof, are of sufficient length to extend beyond the side edges of the deck to form supports for the side rails 4 which extend parallel to the deck and are rigidly secured to the benches. The cleat 3 is made somewhat shorter than the benches and only serves to tie the slats together adjacent to their forward ends but vertical support is afforded to the forward end of the deck by another bench 6 extending transversely of the sled beneath the deck but unsecured thereto, the deck merely resting on the bench and the parts being thus relatively slidable.

For holding the deck in properly spaced relation to the runners 8—9 and connecting the parts together, suitable supports 10 are employed, one pair being disposed beneath the rear bench 2 and another pair beneath the bench 6.

For steering the sled, a steering bar 12 is disposed in advance of the front end of the center slat of the deck so as to normally extend transversely of the sled and project beyond the runners at either side sufficiently to enable the operator to push on one end or the other of the bar with his hands or feet depending on his position on the sled; this bar is fixedly secured to a steering tongue 13 which normally extends parallel to and coincident with the center line of the sled and is desirably made of two vertically spaced strips of flat steel respectively disposed above and below the steering bar. At its rear end the tongue is pivoted to the adjacent end of the center deck slat by a pivot bolt 14 extending vertically through both parts of the tongue which respectively lie both above and below the slat, while at its forward or opposite end the tongue is pivotally connected to two opposite inwardly extending links 15 by a pivot bolt 16; at their outer ends these links are respectively connected by pivots 17 to the adjacent ends of the runners which are upwardly curved to meet the links and flattened to form seats therefor. Extending rearwardly from each of these pivots 17 to the front cross bench 6 is a side bar 18 which normally lies above and substantially parallel to the sub-adjacent runner and is pivoted to the bench at its rear end by a pivot 19. The side bars and links 15 are preferably made of flat steel and are, of course, relatively movable with respect to each other and with respect to the steering tongue 13 by reason of their pivotal interconnection all as more fully described in said Patent Number 1,820,044.

Thus, by pushing on one end or the other of the steering bar 12 to correspondingly turn in the tongue 13 in one direction or the other on pivot 14 the runners may be bent or flexed to the right or left as the case may be, and as is shown in Fig. 2, so as to steer the sled on an arcuate course.

In accordance with the present invention and for the purpose of protecting the links 15 and adjacent parts from impact in a head-on collision, I dispose thereabove a buffer or guard, generally designated as 20, and which is desirably formed of flat steel approximately in the shape shown in Figs. 4 and 5, and thus comprises at its center an offset 21 providing therebeneath a shallow recess 22 and oppositely outwardly extending arms 23 inclined slightly angularly rearwardly toward each other so that the guard when viewed from above as in Fig. 4 is of slightly arcuate or blunt V-shape. In order to provide a pivotal lost motion connection between the buffer and the runners the arms 23 are provided adjacent their outer ends with slots 24, practically elliptical in shape with their longer axes extending parallel to the respective arms and of sufficient width to readily permit the passage of the pivot bolts or pins 17 by means of which the buffer is secured in operative relation to the sled so as to overlie the links 15 and side bars 18 the offset portion 21 at the center of the buffer providing a clearance for the adjacent end of the tongue and head of the pivot 16 and thus preventing contact between these parts and the buffer which lies closely adjacent the links, being separated from the plane thereof merely by a distance substantially equal to the thickness of the side bars. When in this position the forward edge of the buffer extends slightly in advance of the corresponding edges of the links when the latter are in normal position, that is, when the runners of the sled are unflexed, and as that is the foremost position ever occupied by the links since they move rearwardly therefrom when the sled is steered to one side or the other as shown in Fig. 2, the buffer 20 is always in a position to receive the impact of a head-on collision while since its extremities are respectively secured solely through the medium of the pivots 17 to the side bars and runners of the sled, the force of such a collision is thus principally distributed to the latter and the links 15, tongue 13 and deck substantially relieved therefrom. Therefore, it results that the likelihood of injury to these last mentioned parts is substantially obviated, while as the pivots 17 can freely slide in the slots 24 when the runners are flexed in one direction or the other because of the peculiar shape and disposition of the slots, a sled constructed in accordance with the present invention can be steered as easily and efficiently as those of the type disclosed in said Patent Number 1,820,044, the presence of the buffer in no way detracting from its ability in this regard.

While I have herein described and illustrated one embodiment of my invention with some particularity, it will be understood that I do not intend to limit or confine myself solely thereto as minor changes in details of construction and arrangement may be made if desired without departing from the spirit and scope of the invention as defined in the appended claims.

Having thus described my invention I claim and desire to protect by Letters Patent of the United States:

1. A buffer for a steering sled having laterally bendable runners and side bars disposed above the forward portions thereof, comprising a flat metal bar extending between the front ends of the runners and having arms oppositely divergent from its center and slots in the extremities of said arms, the center portion of said bar being vertically upwardly offset, and pivots extending through the slots in said arms and the front ends of the runners operative to maintain pivotal connection between the buffer and the runners to support the buffer in operative relation with the sled with its forward edge in advance of all portions of the sled in any position of the runners thereof.

2. A steering sled having laterally bendable runners, side bars, a deck disposed therebetween, links extending oppositely inward from the front end of the runners, pivots connecting the side bars, links and runners, a tongue extending between the deck and the links and pivotally connected thereto, and a buffer comprising a flat metal bar extending between the front ends of the runners and having rearwardly diverging arms located above the links and extending in advance of the latter in any position of the same, said buffer having a pivotal lost motion connection with the runners supporting the buffer and permitting relative movement between the buffer and the runners whereby the buffer will prevent injury to the links and the deck without interfering in any way with the steering of the sled.

In witness whereof, I have hereunto set my hand this 20th day of August, A. D. 1931.

WILLIAM C. WARREN.